US012749763B2

(12) United States Patent
Kim et al.

(10) Patent No.: US 12,749,763 B2
(45) Date of Patent: Sep. 29, 2026

(54) BATTERY RACK, POWER STORAGE DEVICE, AND POWER GENERATION SYSTEM

(71) Applicant: LG ENERGY SOLUTION, LTD., Seoul (KR)

(72) Inventors: Hee-Chan Kim, Daejeon (KR); Goan-Su Jung, Daejeon (KR); Kyung-Min Lee, Daejeon (KR); Seung-Jun Lee, Daejeon (KR); Kown Son, Daejeon (KR); Jong-Soo Lee, Daejeon (KR); Seung-Joon Jeon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 776 days.

(21) Appl. No.: 18/028,645

(22) PCT Filed: Oct. 14, 2021

(86) PCT No.: PCT/KR2021/014283
§ 371 (c)(1),
(2) Date: Mar. 27, 2023

(87) PCT Pub. No.: WO2022/086060
PCT Pub. Date: Apr. 28, 2022

(65) Prior Publication Data

US 2024/0014507 A1 Jan. 11, 2024

(30) Foreign Application Priority Data

Oct. 19, 2020 (KR) ........................ 10-2020-0135370

(51) Int. Cl.
*H01M 50/383* (2021.01)
*H01M 50/211* (2021.01)
*H01M 50/609* (2021.01)

(52) U.S. Cl.
CPC ....... *H01M 50/383* (2021.01); *H01M 50/211* (2021.01); *H01M 50/609* (2021.01); *H01M 2200/10* (2013.01)

(58) Field of Classification Search
CPC . H01M 50/383; H01M 50/211; H01M 50/609
See application file for complete search history.

(56) References Cited

U.S. PATENT DOCUMENTS

2012/0176080 A1 7/2012 Uchihashi et al.
2018/0040932 A1 2/2018 Lee et al.
(Continued)

FOREIGN PATENT DOCUMENTS

CN 106898714 A 6/2017
CN 109244594 A 1/2019
(Continued)

OTHER PUBLICATIONS

Machine Translation of: Nakazawa et al. (JP 2019-075191 A), May 16, 2019.*
(Continued)

*Primary Examiner* — Kenneth J Douyette
(74) *Attorney, Agent, or Firm* — Birch, Stewart, Kolasch & Birch, LLP

(57) ABSTRACT

The present disclosure discloses a battery rack, a power storage device, and a power generation system that reduce manufacturing costs and are easy to install. The battery rack can include a plurality of battery modules, at least one rack case to accommodate the plurality of battery modules, an injection pipe including a main body portion including an inlet through which an extinguishing agent is injected and extending along an arrangement of the plurality of battery modules, and a distribution unit extending toward each of the plurality of battery modules from the main body portion and including an outlet inserted into each of the plurality of
(Continued)

battery modules, and a flexible pipe including a first coupler to be connectable to a supply pipe for supplying the extinguishing agent, and a second coupler to be connectable to the inlet of the injection pipe.

12 Claims, 7 Drawing Sheets

(56) References Cited

U.S. PATENT DOCUMENTS

| | | | | |
|---|---|---|---|---|
| 2018/0241092 | A1* | 8/2018 | Goitsuka | A62C 35/10 |
| 2018/0347738 | A1 | 12/2018 | Zhang | |
| 2020/0038698 | A1 | 2/2020 | Ryu et al. | |
| 2020/0139178 | A1* | 5/2020 | Olivo | A62C 35/68 |

FOREIGN PATENT DOCUMENTS

| | | | |
|---|---|---|---|
| CN | 109891625 | A | 6/2019 |
| CN | 110010810 | A | 7/2019 |
| GB | 2 277 830 | A | 11/1994 |
| JP | 6-467 | U | 1/1994 |
| JP | 6-349521 | A | 12/1994 |
| JP | 2003-346922 | A | 12/2003 |
| JP | 4901259 | B2 | 3/2012 |
| JP | 5715135 | B2 | 5/2015 |
| JP | 2019-75191 | A | 5/2019 |
| JP | 2020-156768 | A | 10/2020 |
| KR | 10-1711046 | B1 | 2/2017 |
| KR | 10-1706717 | B1 | 3/2017 |
| KR | 10-1918022 | B1 | 11/2018 |
| KR | 10-2106153 | B1 | 5/2020 |
| KR | 10-2154314 | B1 | 9/2020 |

OTHER PUBLICATIONS

European Search Report for European Application No. 21883131.1, dated Aug. 7, 2024.

International Search Report for PCT/KR2021/014283 (PCT/ISA/210) mailed on Jan. 27, 2022.

* cited by examiner

BATTERY RACK, POWER STORAGE DEVICE, AND POWER GENERATION SYSTEM

TECHNICAL FIELD

The present disclosure relates to a battery rack, a power storage device, and a power generation system, and more particularly, to a battery rack, a power storage device, and a power generation system that reduce manufacturing costs and are easy to install.

The present application claims priority to Korean Patent Application No. 10-2020-0135370 filed on Oct. 19, 2020 in the Republic of Korea, the disclosures of which are incorporated herein by reference.

BACKGROUND ART

Currently commercialized secondary batteries include nickel-cadmium batteries, nickel-hydrogen batteries, nickel-zinc batteries, and lithium secondary batteries, and among them, lithium secondary batteries have almost no memory effect compared to nickel-based secondary batteries, and thus, are in the spotlight for their advantages of free charge and discharge, extremely low self-discharge rate, and high energy density.

These lithium secondary batteries mainly use a lithium-based oxide and a carbon material as a positive electrode active material and a negative electrode active material, respectively. Lithium secondary batteries include an electrode assembly in which a positive electrode plate and a negative electrode plate to which a positive electrode active material and a negative electrode active material are applied, respectively, are arranged with a separator therebetween, and an exterior, that is, a battery pouch exterior, for sealing and storing the electrode assembly together with an electrolyte.

Recently, secondary batteries are widely used not only in small devices such as portable electronic devices, but also in medium and large devices such as vehicles or power storage devices. When used in these medium and large devices, a large number of secondary batteries are electrically connected to increase capacity and output. Especially, pouch-type secondary batteries are widely used in these medium and large devices due to an advantage of easy stacking.

Meanwhile, recently, as the need for a large-capacity structure as well as utilization as an energy storage source increases, there is an increasing demand for a plurality of secondary batteries connected in series and/or parallel, and a battery rack including a battery module that accommodates theses secondary batteries therein and a battery management system (BMS).

Also, such a battery rack generally includes a rack case of a metal material in order to protect a plurality of battery modules from external impact or accommodate and store the plurality of battery modules. Furthermore, as the demand for a high-capacity battery rack is increasing, the demand for a battery rack in which a plurality of battery modules of a heavy load are accommodated is increasing.

Battery racks of the related art has cooled secondary batteries or performed fire suppression by operating fire-fighting facilities when thermal runaway of secondary batteries of each battery module occurs or secondary batteries ignite or explode.

However, because positions of outlets of extinguishing agent supply pipes of provided fire-fighting facilities are different according to installation places, it is necessary to design a transfer pipe that transfers an extinguishing agent to a plurality of battery modules according to a position of an outlet of a supply pipe every time, and thus a battery rack including a plurality of battery modules has a problem of increasing manufacturing costs.

Furthermore, in the related art, an extremely difficult operation such as pipe welding has been required to perform an operation of connecting a supply pipe of a fire-fighting facility to a transfer pipe included in a battery rack. Accordingly, there has been a problem of increasing time and cost for installing a battery rack.

DISCLOSURE

Technical Problem

The present disclosure is designed to solve the problems of the related art, and therefore the present disclosure is directed to providing a battery rack, a power storage device, and a power generation system that reduce manufacturing costs and are easy to install.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

A battery rack according to the present disclosure for achieving the object includes:

a plurality of battery modules;

at least one rack case to accommodate the plurality of battery modules;

an injection pipe including a main body portion including an inlet through which an extinguishing agent is injected and the main body portion extending along an arrangement of the plurality of battery modules, and a distribution unit extending toward each of the plurality of battery modules from the main body portion and including an outlet inserted into each of the plurality of battery modules; and a flexible pipe to be bendable and including a first coupler located at one end of the flexible pipe to be connectable to a supply pipe for supplying the extinguishing agent, and a second coupler located at the other end of the flexible pipe to be connectable to the inlet of the injection pipe.

Also, the battery rack may further include a connector provided at an outlet of the supply pipe or the inlet of the injection pipe, having a nozzle shape, and including a fixing groove formed by retreating a portion of the nozzle shape in an inward direction.

Also, in the battery rack, the first coupler or the second coupler may include an accommodating space into which a portion of the connector is inserted.

Also, the first coupler or the second coupler may include a fixing protrusion to be fixed to the fixing groove of the connector in the accommodating space when the connector is inserted into the accommodating space.

Also, the distribution unit of the injection pipe may protrude and extend toward each of the plurality of battery modules in a form branched from the main body portion, and an extended end portion of the distribution unit may be inserted into each of the plurality of battery modules by penetrating the same.

Also, the end portion of the distribution unit includes a passive valve to be opened when an internal temperature of the battery module rises above a predetermined temperature, which is inserted into each of the battery modules by penetrating the same.

Furthermore, a lower end of the injection pipe includes a connector.

The drain pipe may include a third coupler located at one end portion of the drain pipe and configured to be connected to the connector provided at the lower end of the injection pipe, and a discharge valve located at the other end portion of the drain pipe and configured to control whether the extinguishing agent is discharged.

Also, the battery rack may include two or more rack cases stacked in upward and down ward directions.

The injection pipe may be provided on each of the two or more rack cases.

The battery rack may further include an intermediate pipe to connect between an injection pipe provided on a rack case located on a relatively upper portion and an injection pipe provided on a rack case located on a relatively lower portion, the rack cases being from among the stacked two or more rack cases, and to have a bendable form.

Furthermore, the main body portion of the injection pipe may have a shape branched to two or more parts from the inlet.

Furthermore, the rack case may include a cover portion including an accommodating space that accommodates the flexible pipe or the intermediate pipe to cover the flexible pipe or the intermediate pipe.

In addition, a power storage device of the present disclosure for achieving the above object includes at least one battery rack.

Furthermore, a power generation system of the present disclosure for achieving the above object includes at least one battery rack.

Advantageous Effects

According to an aspect of the present disclosure, by including a flexible pipe, the present disclosure may facilitate a connection between a supply pipe and an injection pipe of a fire-fighting facility provided at a place where a battery rack is installed. That is, because a position of an outlet of the supply pipe for supplying an extinguishing agent at the installation place where the battery rack is installed is not constant, when a pipe with a fixed position is used, there is a problem in that a separate custom-made connection pipe connecting the supply pipe and the injection pipe is additionally required. In contrast, the present disclosure may facilitate a connection between the outlet of the supply pipe and an inlet of the injection pipe by using the flexible pipe even when the position of the outlet of the supply pipe is not constant. Accordingly, the present disclosure may increase the efficiency of an operation of installing the battery rack and reduce manufacturing costs of the battery rack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
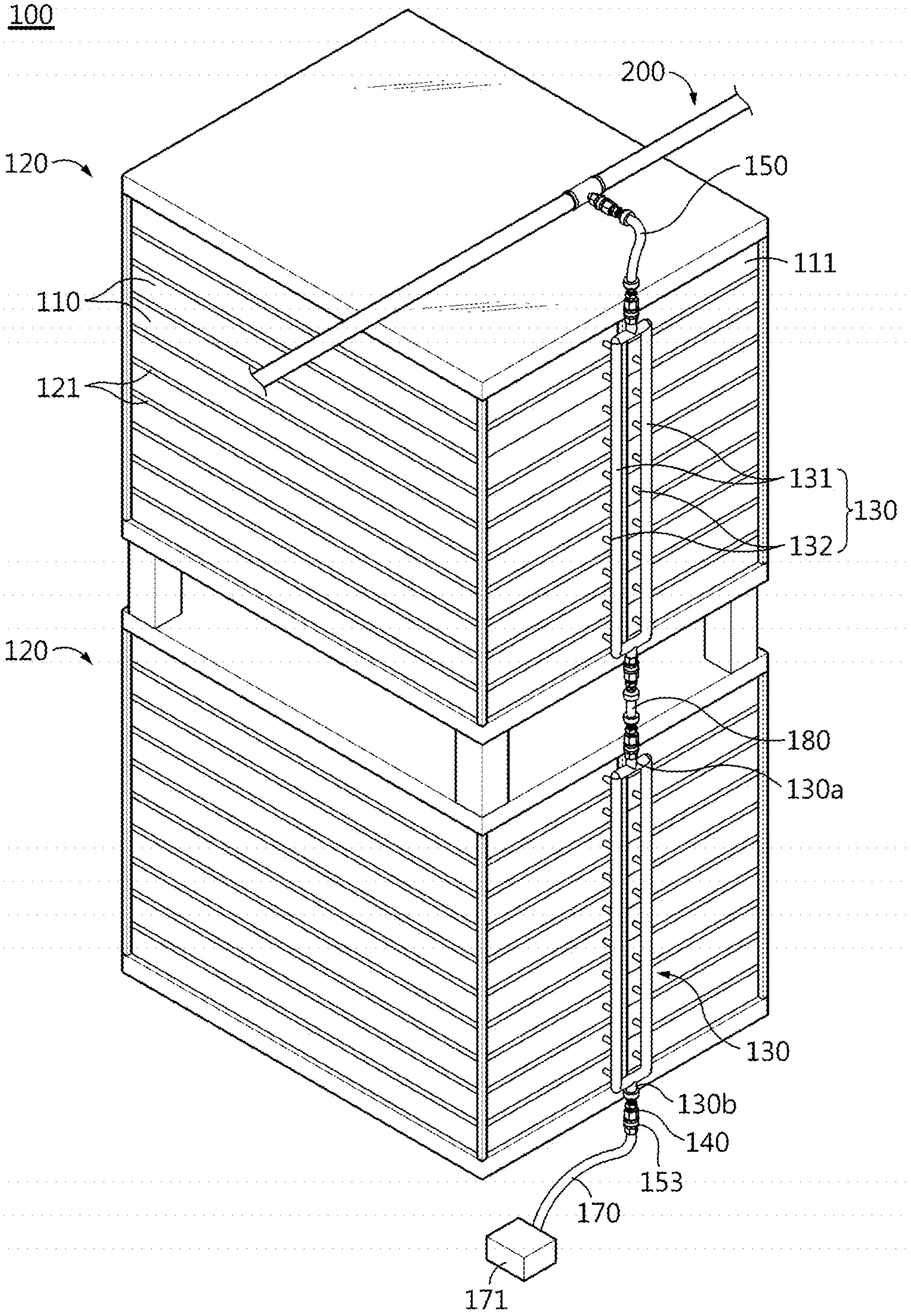
FIG. 1 is a rear perspective view schematically showing a battery rack according to an embodiment of the present disclosure.

FIG. 1 is a rear perspective view schematically showing a battery rack according to an embodiment of the present disclosure. In addition, FIG. 2 is a partial front view schematically showing some components of a battery rack, according to an embodiment of the present disclosure.

Figure 2:
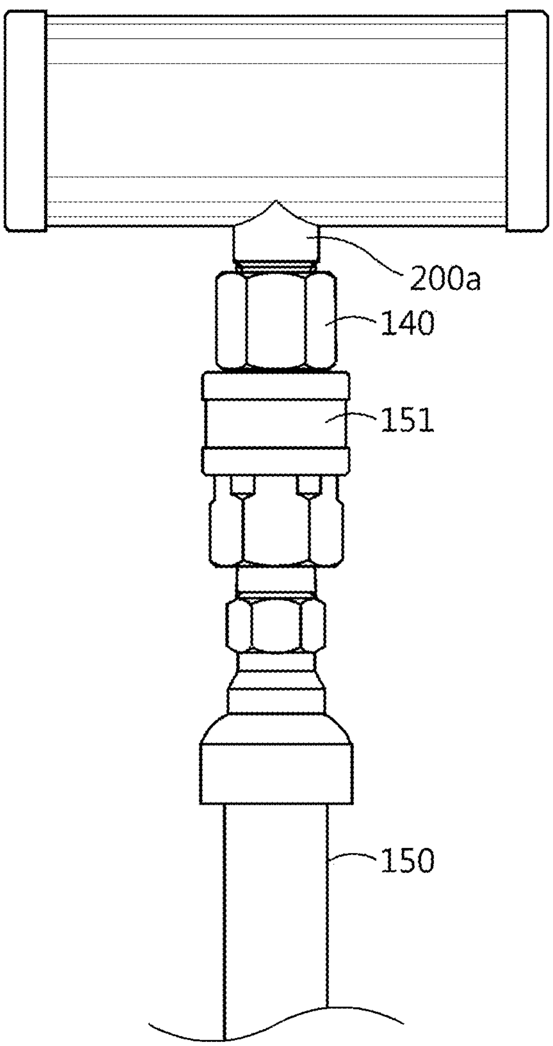
FIG. 2 is a partial front view schematically showing some components of a battery rack, according to an embodiment of the present disclosure.

Referring to FIGS. 1 and 2, a battery rack 100 according to an embodiment of the present disclosure includes a plurality of battery modules 110, at least one rack case 120, an injection pipe 130, and a flexible pipe 150.

Specifically, the plurality of battery modules 110 may be stored in the rack case 120 to be arranged in upward and downward directions. Each of the battery modules 110 may include a module housing 111 and a plurality of battery cells (not shown) provided in the module housing 111 and stacked in one direction. For example, the battery cells may be pouch-type battery cells.

However, the battery cells of the battery module 110 according to the present disclosure is not limited to the pouch-type battery cells, and various battery cells known at the time of filing of the present disclosure may be employed.

Also, the rack case 120 may accommodate the plurality of battery modules 110 therein. For example, as shown in FIG.

2, the rack case 120 may include a plurality of storing plates 121 for storing one battery module 110. Two of the plurality of storing plates 121 may be configured to support in an upward direction lower end portions of the battery module 110 in left and right sides. Also, the two storing plates 121 may serve as a stopper for preventing the other battery module 110 placed thereunder from moving upward.

Furthermore, the injection pipe 130 may include a main body portion 131 and a distribution unit 132. The main body portion 131 may include an inlet 130*a* (see FIG. 7) through which an extinguishing agent (not shown) is injected and an outlet 130*b* (see FIG. 7). Here, the extinguishing agent may be a concentrated solution of an inorganic salt such as potassium carbonate, chemical foam, air foam, carbon dioxide, or water. The inlet may be located at an upper end of the main body portion 131. The outlet may be located at a lower end of the main body portion 131. The main body portion 131 may have a shape extending along an arrangement of the plurality of battery modules 110. The main body portion 131 may have a shape extending in the upward and downward directions along the battery modules 110 arranged in the upward and downward directions.

In addition, the distribution unit 132 may have a shape extending from the main body portion 131 to each of the plurality of battery modules 110. That is, the distribution unit 132 may be a portion branched from the main body portion 131 to each of the plurality of battery modules 110. The distribution unit 132 may extend toward the plurality of battery modules 110. An outlet (not shown) configured to discharge an extinguishing agent may be provided at an extended end portion of the distribution unit 132. The outlet may be inserted into each of the plurality of battery modules 110.

Figure 3:
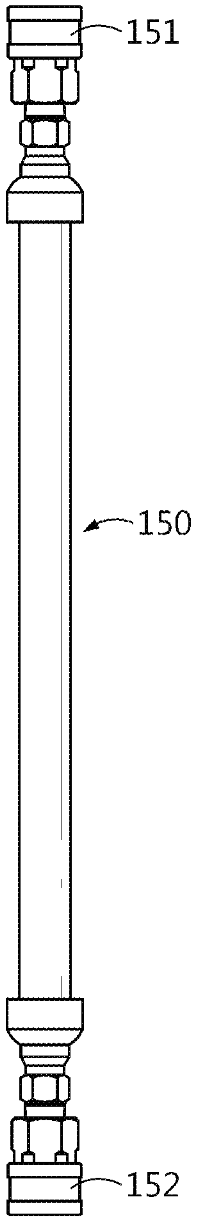
FIG. 3 is a partial front view schematically showing a flexible pipe of a battery rack, according to an embodiment of the present disclosure.

FIG. 3 is a partial front view schematically showing a flexible pipe of a battery rack, according to an embodiment of the present disclosure.

Referring to FIG. 3 together with FIGS. 1 and 2 again, the flexible pipe 150 may include a first coupler 151 and a second coupler 152. The first coupler 151 may be coupled to one end of the flexible pipe 150. The first coupler 151 may be connected to a supply pipe 200 for supplying an extinguishing agent. That is, the first coupler 151 may be configured to be connected to an outlet 200*a* of the supply pipe 200. In addition, the second coupler 152 may be coupled to the other end of the flexible pipe 150. The second coupler 152 may be connected to an inlet formed on an upper end of the main body portion 131 of the injection pipe 130.

Furthermore, the flexible pipe 150 may be bendable. That is, the flexible pipe 150 may include a flexible material. The flexible material may be, for example, a plastic material. Alternatively, the flexible pipe 150 may have a bendable structure. For example, the flexible pipe 150 may be formed in the form of a multi-layered pipe by weaving a plurality of round and narrow stainless steel wires. However, the flexible pipe 150 is not necessarily limited to this structure, and the flexible pipe 150 in various known forms may be applied.

Therefore, according to this configuration of the present disclosure, by including the flexible pipe 150, the present disclosure may facilitate a connection between the supply pipe 200 and the injection pipe 130 of a fire-fighting facility provided at a place where the battery rack 100 is installed. That is, because a position of the outlet 200*a* of the supply pipe 200 for supplying an extinguishing agent at the installation place where the battery rack 100 is installed is not constant, when a pipe with a fixed position is used, there is a problem in that a separate custom-made connection pipe connecting the supply pipe 200 and the injection pipe 130 is additionally required. In contrast, the present disclosure may facilitate a connection between the outlet 200*a* of the supply pipe 200 and an inlet of the injection pipe 130 by using the flexible pipe 150 even when the position of the outlet 200*a* of the supply pipe 200 is not constant. Accordingly, the present disclosure may increase the efficiency of an operation of installing the battery rack 100 and reduce manufacturing costs of the battery rack 100.

Figure 4:
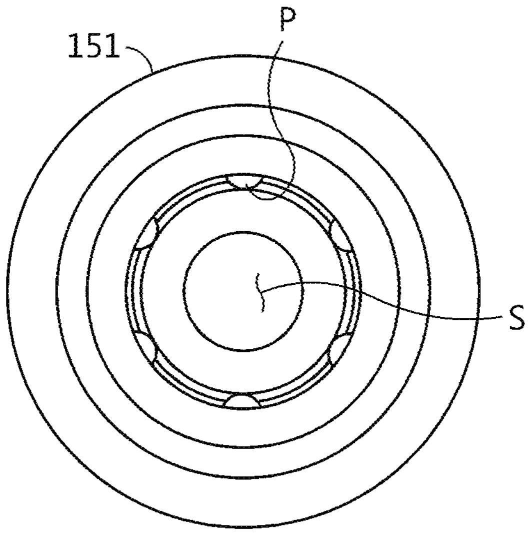
FIG. 4 is a plan view schematically showing components of FIG. 3.

FIG. 4 is a plan view schematically showing components of FIG. 3. In addition, FIG. 5 is a front view schematically showing some components of a battery rack, according to an embodiment of the present disclosure.

Figure 5:
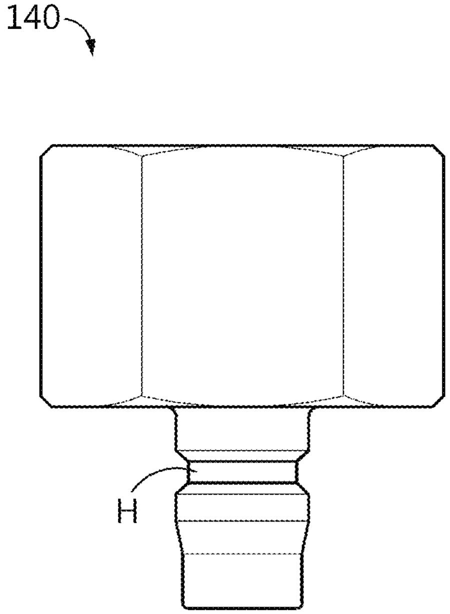
FIG. 5 is a front view schematically showing some components of a battery rack, according to an embodiment of the present disclosure.

Referring to FIGS. 4 and 5 together with FIGS. 1 and 3 again, the battery rack 100 according to an embodiment of the present disclosure may include a connector 140 configured to be detachably coupled to the first coupler 151 or the second coupler 152.

Figure 7:
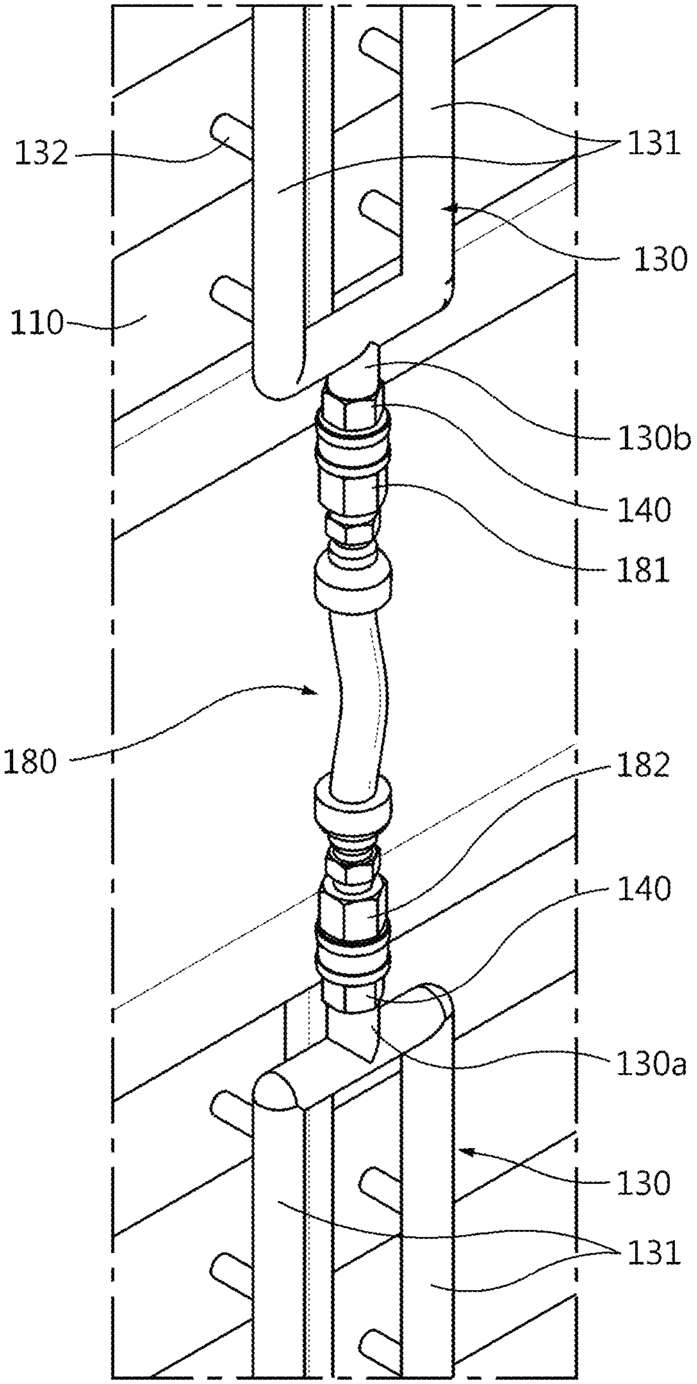
FIG. 7 is a partial rear perspective view schematically showing some components of a battery rack, according to an embodiment of the present disclosure.

Specifically, the connector 140 may be provided at the outlet 200*a* of the supply pipe 200, the inlet 130*a* (see FIG. 7) of the injection pipe 130, and the outlet 130*b* (see FIG. 7). For example, the connector 140 may be coupled to the outlet 200*a* of the supply pipe 200. The connector 140 may also be coupled to the inlet 130*a* of the injection pipe 130. The connector 140 may have a nozzle shape protruding in one direction. The connector 140 may include a fixing groove H formed by retreating a portion of the nozzle shape is inserted in an inward direction.

Also, the first coupler 151 or the second coupler 152 may include an accommodating space S into which a portion (nozzle portion) of the connector 140 is inserted. The first coupler 151 or the second coupler 152 may include a fixing protrusion P to be fixed to the fixing groove H of the connector 140 in the accommodating space S when the connector 140 is inserted into the accommodating space S. The fixing protrusion P may include, for example, six metal beads (bearings).

That is, when the connector 140 is inserted into the accommodating space S of the first coupler 151 or the second coupler 152, the six metal beads may be inserted and fixed into the fixing groove H of the connector 140 by pressing the six metal beads by using an external housing provided in each of the couplers 151 and 152. However, embodiments of the present disclosure are not necessarily limited thereto, and a quick coupler or quick joint in various known forms may be employed as the first coupler 151 or the second coupler 152.

Therefore, according to this configuration of the present disclosure, the present disclosure may facilitate a connection between the flexible pipe 150 and the outlet 200*a* of the supply pipe 200 or the inlet 130*a* of the injection pipe 130 by using the connector 140 and the couplers 151 and 152 coupled to the connector 140. Accordingly, the present disclosure may increase the efficiency of an operation of installing the battery rack 100.

Referring back to FIG. 1, the distribution unit 132 of the injection pipe 130 may protrude and extend toward each of the plurality of battery modules 110 in a shape branched from the main body portion 131. In addition, an extended end portion of the distribution unit 132 may be inserted into each of the plurality of battery modules 110 by penetrating the same. For example, an opening may be formed in a rear surface of the module housing 111 of the battery module 110 so that an end portion (outlet) of the distribution unit 132 may be inserted thereto.

Therefore, according to this configuration of the present disclosure, the distribution unit 132 of the injection pipe 130 of the present disclosure is directly inserted into the battery module 110, and thus, an extinguishing agent may be directly sprayed into the battery module 110 in which a fire has occurred, and thus an extinguishing effect may be extremely excellent. Accordingly, the present disclosure may increase fire safety.

Figure 6:
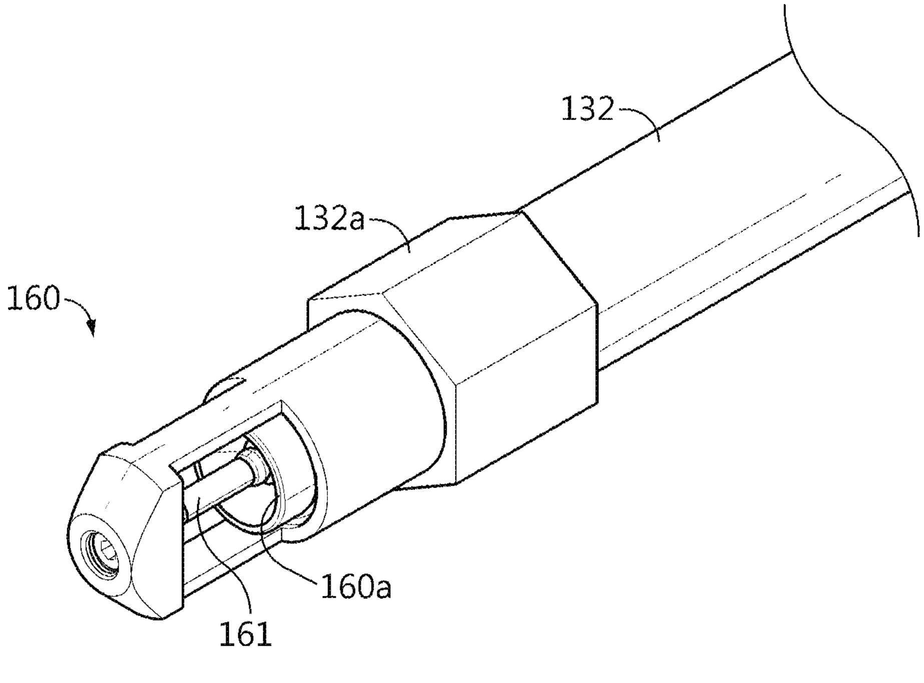
FIG. 6 is a partial perspective view schematically showing some components of a battery rack, according to an embodiment of the present disclosure.

FIG. 6 is a partial perspective view schematically showing some components of a battery rack, according to an embodiment of the present disclosure.

Referring to FIG. 6 together with FIG. 1, the present disclosure may further include a passive valve 160 at an end portion 132*a* of the distribution unit 132, which is inserted into each of the battery modules 110 by penetrating the same. The passive valve 160 may be configured such that the valve is opened when an internal temperature of the battery module 110 rises above a predetermined temperature. That is, the passive valve 160 may be an outlet of the distribution unit 132.

Specifically, the passive valve 160 may include a glass bulb 161 configured to be broken at a predetermined temperature or higher. The glass bulb 161 may be configured to usually close an outlet 160*a* of the passive valve 160. However, when the glass bulb 161 increases in temperature and thus ruptured and is lost to the outside, a closed state of the outlet 160*a* of the passive valve 160 may be released, and the outlet 160*a* of the valve may be opened.

Therefore, according to this configuration of the present disclosure, by including the passive valve 160, the present disclosure may supply an extinguishing agent because only a valve of a distribution unit 132, which is inserted into a battery module 110 where a fire has occurred, is opened when the fire occurs in only some of the plurality of battery modules 110. Because the extinguishing agent is not supplied to the remaining battery modules 110 where the fire has not occurred, there is an advantage in that the remaining battery modules 110 may be re-used after the fire is extinguished. Also, in the present disclosure, because an extinguishing agent is not supplied to an unnecessary place, the extinguishing agent may be rapidly supplied to battery modules 110 that need extinguishing, thereby increasing the speed of extinguishing suppression.

Referring back to FIG. 1, the battery rack 100 of the present disclosure may further include a drain pipe 170. The drain pipe 170 may be bendable. Also, an outlet 130*b* may be provided at a lower portion of the injection pipe 130. The connector 140 may be provided at the outlet 130*b*. The drain pipe 170 may be configured to be connected to the connector 140 located at one end portion thereof and coupled to a lower end of the injection pipe 130. For example, the drain pipe 170 may include a third coupler 153 configured to be connected to the connector 140.

Also, the drain pipe 170 may include a discharge valve 171 at the other end portion thereof. The discharge valve 17 may be configured to control whether the extinguishing agent is discharged. That is, when the discharge valve 17 is opened, the extinguishing agent existing inside the injection pipe 130 may be discharged to the outside through the drain pipe 170.

Therefore, according to this configuration of the present disclosure, the present disclosure may facilitate discharging of the extinguishing agent remaining in the injection pipe 130 to the outside through the drain pipe 170. That is, the present disclosure may discharge an unnecessary extinguishing agent to the outside after fire suppression is finished, and after a fire, may facilitate performing of a subsequent operation.

FIG. 7 is a partial rear perspective view schematically showing some components of a battery rack, according to an embodiment of the present disclosure. That is, FIG. 7 shows an enlarged state of a portion between stacked rack cases 120.

Referring to FIG. 7 together with FIG. 1 again, the battery rack 100 according to an embodiment of the present disclosure may include two or more rack cases 120 stacked in the upward and downward directions. In this case, the injection pipe 130 may be provided on each of the two or more rack cases 120.

Also, the battery rack 100 may further include an intermediate pipe 180. The intermediate pipe 180 may connect between an injection pipe 130 provided on a rack case 120 located on a relatively upper portion and an injection pipe 130 provided on a rack case 120 located on a relatively lower portion, the rack cases 120 being from among the stacked two or more rack cases 120. That is, the intermediate pipe 180 may be located between stacked two rack cases 120. For example, as shown in FIG. 1, one end of the intermediate pipe 180 may be connected to an outlet 130*b* of an injection pipe 130 connected to a rack case 120 located on a relatively upper portion among the stacked two rack cases 120. Also, the other end of the intermediate pipe 180 may be connected to an inlet of an injection pipe 130 connected to a rack case 120 located on a relatively lower portion among the stacked two rack cases 120.

The intermediate pipe 180 may include a fourth coupler 181 and a fifth coupler 182. The fourth coupler 181 may be configured to be connected to an outlet 130*b* of an injection pipe 130 located on an upper portion among injection pipes 130 arranged in upward and downward directions. For example, the fourth coupler 181 may be configured to be coupled to a connector 140 provided at the outlet 130*b* of the injection pipe 130. The fifth coupler 182 may be configured to be connected to an inlet 130*a* of an injection pipe 130 located on a lower portion among the injection pipes 130 arranged in the upward and downward directions. For example, the fifth coupler 182 may be configured to be coupled to a connector 140 provided at the inlet 130*a* of the injection pipe 130.

Furthermore, the intermediate pipe 180 may include a bendable pipe. That is, a pipe having a flexible material or a bendable structure may be applied in the same manner as the flexible pipe 150 described above.

Therefore, according to this configuration of the present disclosure, by including the intermediate pipe 180, the present disclosure facilitates the transfer of an extinguishing agent between at least two rack cases 120. Accordingly, manufacturing costs of the battery rack 100 may be reduced by simplifying a structure of a member for supplying an extinguishing agent.

Furthermore, in a case where the intermediate pipe 180 is bendable, even when there is a spaced error between stacked rack cases 120, injection pipes 130 may be easily connected by using the flexible pipe 150. Accordingly, the present disclosure has an advantage of easy installation.

Also, the main body portion 131 of the injection pipe 130 may have a shape branched to at least two parts from the inlet 130*a*. For example, as shown in FIG. 7, a main body portion 131 of each of the injection pipes 130 arranged in the upward and downward directions may have a shape branched to two parts.

Therefore, according to this configuration of the present disclosure, by including an injection pipe 130 having a shape branched to at least two parts, when an extinguishing agent is injected into a battery module 110 through a distribution unit 132 connected to any one of branched pipes of a main body portion 131 of an injection pipe 130 located on an upper portion among injection pipes 130 arranged in the upward and the downward directions, the present disclosure has an advantage of transferring the extinguishing agent to an injection pipe 130 located on a lower portion through the remaining pipe unselected from the branched pipes of the main body portion 131 while the extinguishing agent is filled into the battery module 110.

In contrast, when the injection pipe 130 includes a single pipe rather than having a branched shape, transferring of an extinguishing agent to an injection pipe located on a relatively lower portion may not be smooth while the extinguishing agent is filled into a specific battery module 110.

Accordingly, when a fire occurs in all stacked rack cases, the present disclosure has an advantage of being able to smoothly supplying an extinguishing agent to the rack cases at the same time.

Figure 8:
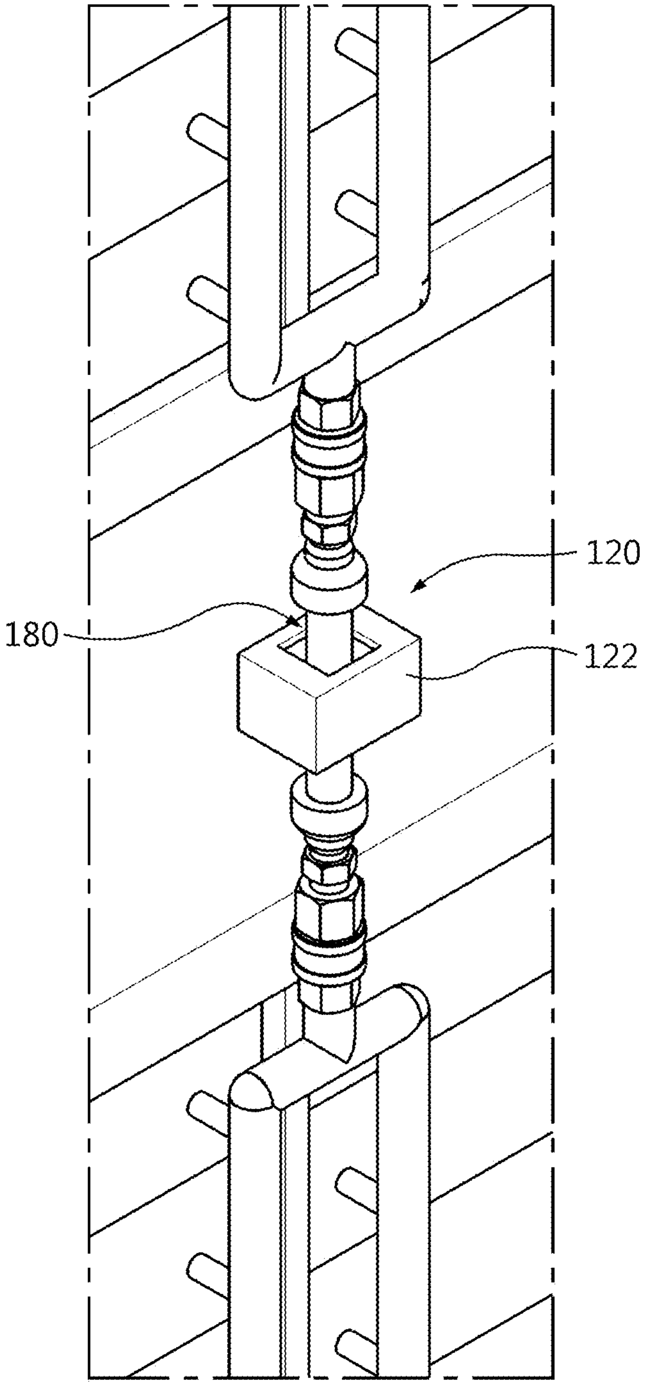
FIG. 8 is a partial rear perspective view schematically showing some components of a battery rack, according to another embodiment of the present disclosure.

FIG. 8 is a partial rear perspective view schematically showing some components of a battery rack, according to another embodiment of the present disclosure.

Referring to FIG. 8, the battery rack 100 according to another embodiment of the present disclosure may further include a cover portion 122 configured to cover the flexible pipe 150 or the intermediate pipe 180 when compared to the battery rack 100 of FIG. 1. Also, the cover portion 122 may include an accommodating space for the flexible pipe 150 or the intermediate pipe 180. The cover portion 122 may include a wall extending to surround the flexible pipe 150 or the intermediate pipe 180.

For example, as shown in FIG. 8, the cover portion 122 may have a shape bent in a horizontal direction several times to surround the intermediate pipe 180. Although not shown, the rack case 120 may include a separate cover portion configured to cover the flexible pipe 150.

Referring back to FIG. 1, a power storage device according to the present disclosure may include at least one battery rack 100 according to the present disclosure. For example, as shown in FIG. 1, the power storage device may include two or more rack cases 120 according to the present disclosure in a stacked form. In addition, battery modules 110 stored in each of the plurality of rack cases 120 may be electrically connected to each other. The power storage device according to the present disclosure may be implemented in various forms, such as a smart grid system or an electric charging station.

Meanwhile, the present disclosure provides a power generation system including at least one battery rack 100. The power generation system may include a hydro power generator, a thermal power generator, a wind power generator, a solar generator, and the like. Electricity generated from these generators may be stored in the battery rack 100.

Meanwhile, although the terms indicating directions such as up, down, left, right, front, and back are used in the present specification, it would be obvious to a person skilled in the art that the terms are only for convenience of description and may vary depending on the position of an object or the position of an observer.

As described above, although the present disclosure has been described with reference to limited embodiments and drawings, the present disclosure is not limited thereto, and various modifications and variations are possible within the technical idea of the present disclosure and the scope of equivalents of the claims to be described below by those of ordinary skill in the art to which the present disclosure pertains.

[Explanation of numeral references]

| | |
|---|---|
| 100: Battery rack | |
| 110: Battery module | 111: Module case |
| 120: Rack case | 121: Storing plate |
| 200: Supply pipe | 130: Injection pipe |
| 131, 132: Main body portion, Distribution unit | |
| 140: Connector | 150: Flexible pipe |
| 151, 152, 153, 181, 182: First coupler, Second coupler, Third coupler, Fourth coupler, Fifth coupler. | |
| H: Fixing groove | P: Fixing protrusion |
| 160: Passive valve | 161: Glass bulb |
| 170: Drain pipe | |
| 171: Discharge valve | 180: Intermediate pipe |
| 122: Cover portion | |

What is claimed is:

1. A battery rack comprising:

a plurality of battery modules;

a rack case to accommodate the plurality of battery modules;

an injection pipe comprising:

a main body portion including an inlet through which an extinguishing agent is injected and the main body portion extending along an arrangement of the plurality of battery modules, the main body portion having two parallel branched pipes extending from the inlet; and a distributor extending toward each of the plurality of battery modules from the main body portion and including an outlet inserted into each of the plurality of battery modules; and a flexible pipe to be bendable and comprising:

a first coupler located at a first end of the flexible pipe to be connectable to a supply pipe for supplying the extinguishing agent; and a second coupler located at a second end of the flexible pipe to be connectable to the inlet of the injection pipe.

2. The battery rack of claim 1, further comprising:

a connector provided at an outlet of the supply pipe or the inlet of the injection pipe, having a nozzle shape, and comprising a fixing groove formed by retreating a portion of the nozzle shape in an inward direction, wherein the first coupler or the second coupler includes an accommodating space into which a portion of the connector is inserted, and the first coupler or the second coupler comprises a fixing protrusion to be fixed to the fixing groove of the connector in the accommodating space when the connector is inserted into the accommodating space.

3. The battery rack of claim 1, wherein the distributor of the injection pipe protrudes and extends toward each of the plurality of battery modules in a shape branched from the main body portion, and wherein an extended end portion of the distributor is inserted into each of the plurality of battery modules.

4. The battery rack of claim 3, wherein the end portion of the distributor includes a passive valve to be opened when an internal temperature of a battery module of the plurality of battery modules rises above a predetermined temperature, which is inserted into each of the plurality of battery modules.

5. The battery rack of claim 1, wherein a lower end of the injection pipe includes a connector, and the battery rack further comprises:

a drain pipe comprising a third coupler located at one end portion of the drain pipe and configured to be connected to the connector provided at the lower end of the injection pipe; and a discharge valve located at the other end portion of the drain pipe and configured to control whether the extinguishing agent is discharged.

6. The battery rack of claim 1, wherein each of the two parallel branched pipes are connected to each of the plurality of battery modules by the distributor.

7. The battery rack of claim 1, wherein the main body portion extends vertically along an entire height of the plurality of battery modules, and wherein the distributor extends horizontally from the main body portion and into each of the plurality of battery modules.

8. A power storage device comprising one or more of the battery rack according to claim 1.

9. A power generation system comprising one or more of the battery rack according to claim 1.

10. A battery rack comprising:

a plurality of battery modules;

a plurality of rack cases stacked in upward and downward directions and accommodating the plurality of battery modules;

an injection pipe on each of the plurality of rack cases, each injection pipe comprising:

a main body portion including an inlet through which an extinguishing agent is injected and the main body portion extending along an arrangement of the plurality of battery modules; and a distributor extending toward each of the plurality of battery modules from the main body portion and including an outlet inserted into each of the plurality of battery modules;

a flexible pipe to be bendable and comprising:

a first coupler located at a first end of the flexible pipe to be connectable to a supply pipe for supplying the extinguishing agent; and a second coupler located at a second end of the flexible pipe to be connectable to the inlet of the injection pipe; and an intermediate pipe to connect between an injection pipe provided on a rack case located on a relatively upper portion and an injection pipe provided on a rack case located on a relatively lower portion, the rack cases being from among the plurality of rack cases, and to have a bendable form.

11. The battery rack of claim 10, wherein the main body portion of the injection pipe has a shape branched to two or more parts from the inlet.

12. The battery rack of claim 10, wherein each of the plurality of rack cases comprises a cover portion including an accommodating space that accommodates the flexible pipe or the intermediate pipe to cover the flexible pipe or the intermediate pipe.

* * * * *